(12) United States Patent
Bonda et al.

(10) Patent No.: US 9,639,712 B2
(45) Date of Patent: May 2, 2017

(54) METHODS AND APPARATUS FOR PROVIDING VIABLE LANDING SITES FOR A MOBILE DEPLOYMENT OF, INTER ALIA, AN INTERACTIVE HIERARCHICAL ENTITLEMENT FEATURE

(71) Applicant: Bank of America Corporation, Charlotte, NC (US)

(72) Inventors: Ganesh Bonda, Franklin, MA (US); Srinivas Chavali, Charlotte, NC (US); Cary Hudgins, Charleston, NC (US); Edrin Thomas, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 14/964,676

(22) Filed: Dec. 10, 2015

(65) Prior Publication Data

US 2016/0232371 A1    Aug. 11, 2016

Related U.S. Application Data

(63) Continuation-in-part of application No. 14/615,493, filed on Feb. 6, 2015, now Pat. No. 9,379,897.

(51) Int. Cl.
| | |
|---|---|
| *G06F 21/00* | (2013.01) |
| *G06F 21/62* | (2013.01) |
| *G06F 21/60* | (2013.01) |
| *H04L 9/32* | (2006.01) |
| *G06F 17/30* | (2006.01) |
| *G06Q 10/10* | (2012.01) |

(52) U.S. Cl.
CPC ...... *G06F 21/6218* (2013.01); *G06F 17/3053* (2013.01); *G06F 17/30867* (2013.01); *G06F 21/604* (2013.01); *G06Q 10/10* (2013.01); *H04L 9/32* (2013.01); *H04L 9/3247* (2013.01)

(58) Field of Classification Search
CPC .......... G06F 21/45; G06F 21/30; G06F 21/33; G06F 21/335; G06F 21/62; H04L 9/32; H04L 9/3247
See application file for complete search history.

(56) References Cited

U.S. PATENT DOCUMENTS

2005/0055306 A1* 3/2005 Miller .................... G06Q 40/04
705/37

* cited by examiner

*Primary Examiner* — Edward Zee
(74) *Attorney, Agent, or Firm* — Weiss & Arons LLP; Michael A. Springs, Esq.

(57) ABSTRACT

A method for providing hierarchal client entitlement information in a graphical user interface ("GUI") is provided. The method includes deploying the information on a mobile platform. The method may further include inventorying a list of possible landing sites for deploying the mobile platform and determining which of the inventoried landing sites requires, upon deployment, a connection to an Oracle database. The method may further include eliminating any member of the list of possible landing sites that requires, upon deployment, a connection to the Oracle database from the list of possible landing sites. Following the eliminating, the method may include providing a user, via the GUI, a selection capability to select one of the list of possible landing sites as a default landing site for the deploying the mobile platform.

20 Claims, 22 Drawing Sheets

My Favorites [Service]

My Requests   Create Request   Company Requests   [Bank Profile] — 702

Preferences | Contacts | Help ⓘ

Bank Profile 704   706   708
[Accounts (30)]  [Services]  [Signers]
Search:

Accounts

XXXXXX   GSS TEST
Bank ID: XXXXXX   Currency: USD   Country: UNITED STATES   Legal Entity: PRODUCTION SUPPORT, TESTIN
Testing Client XXXXXX   CED PRODUCTION SUPPORT, TESTIN
Bank ID: XXXXXX   Currency: USD   Country: UNITED STATES   Legal Entity: PRODUCTION SUPPORT,
Testing Client XXXXXX   OLS TEST
Bank ID: XXXXXX   Currency: USD   Country: UNITED STATES   Legal Entity: PRODUCTION SUPPORT,
Testing Client XXXXXX   OLS TEST
Bank ID: XXXXXX   Currency: USD   Country: UNITED STATES   Legal Entity: PRODUCTION SUPPORT, Testing Client   ⓘ

Entity Export: PRODUCTION SUPPORT, Testing Client
Total Accounts: 30

[EXPORT] — 710

🖨 Print

GSS TEST   Status CLOSED

Account Information

Account Number:       XXXXXX
Type:                 US DDA
ZBA Account:          Yes
Analysis / Billing:   Yes (view details)

Legal Entity Information
Legal Entity Name:    CED PRODUCTION SUPPORT, Testing
Tax Identification Number:

Signers (5)  ⓘ

Bank ID: XXXXXX
Country: UNITED STATES
CURRENCY: USD

Address 1234 E Main St.
Any town, USA 12345

| My Favorites | Service |
|---|---|

HOME | PROFILE | LOGOUT

902

My Requests   Create Request   Company Requests   Profile

Preferences | Bank Contacts   Help ⓘ

My Requests for *John Smith*

Search: [    ] 🔍 ── 904

↗ Export  🖨 Print

Requests From: 05/26/2015 - 06/25/2015                                    Viewing (9 of 9)

| Filter Options ( Clear All ) | ☐ | ‹‹ | | |
|---|---|---|---|---|

⊟ Request Status
☐ Draft (9)

☐ Open New Account   Request ID: XXXXXX   (1 of 2)                        ‹

Start Date: 06/23/2015 09:58 AM CDT       🗒 Notes (0)
Legal Entity: CED                          Channel Online ── 908
               PRODUCTION
               SUPPORT                     Status ── 910
               Testing Client              📄 Draft
Accounts (1): 0012570761642  test          ☐ Documents (1)

⊟ Request Types ── 906
☐ ACH Services (1)
☐ Information Reporting (3)
☐ Lockbox Services (2)
☐ Open New Account (3)

☐ Information Reporting   Request ID: XXXXXX   (2 of 2)

Start Date: 06/23/2015 09:58 AM CDT        🗒 Notes (0)
Legal Entity: CED                           Channel Online
               PRODUCTION
               SUPPORT                      Status
               Testing Client               📄 Draft
Accounts (0):                               ☐ Documents (0)

⊟ Legal Entity (1)
☐ CEO PRODUCTION SUPPORT, Testi
  ⌄

⊟ Accounts (3)
☐ XXXXXX, Test
☐ XXXXXX, OLS Test
  ⌄

[ Apply Filters ]

[ Delete Draft ]                                                             ›

FIG. 9

My Favorites | Reporting | Service

Create Request  Approvals  [Company Requests]  Profile  — 1002

Company Requests

HOME|PROFILE|LOGOUT

Preferences  Contacts  |  Help ⊙

Search: 🔍

⇱ Export  🖨 Print

View: 🗐  Viewing (109 of 109)

Filter Options ( Clear All )  «

⊞ Request Status
⊞ Request Types
⊞ Company ID
⊞ Requestor
⊞ Channel
⊞ Legal Entity (1)
⊞ Accounts (38)
⊞ Document Types
⊞ Request Approver ☐ Requests From: 01/26/2015 - 02/25/2015

☐ Statement Maintenance | Requestor: John Doe | Request ID: XXXXXX
  Submitted Date: 02/25/2015 10:12 AM EST
  Legal Entity:  CED                              📑 Notes (0)        Status
                 PRODUCTION                       Channel: Online    ▽
                 SUPPORT                                              Pending Approval
                 Testing Client
  Accounts (2): XXXXXX  OLS TEST                  Company ID:         📄 Documents (0)

☐ Address Maintenance | Requestor: Two | Request ID: XXXXXX  (1 of 1)
  Submitted Date: 02/25/2015 10:11 AM EST                        1004
  Legal Entity:  CED                              📑 Notes (0)        Status
                 PRODUCTION                       Channel  Email     ▽
                 SUPPORT                                              Pending Approval
                 Testing Client
  Accounts (1): XXXXXX  OLS TEST                  Company ID: simayone  📄 Documents (0)

[Reassign] [Delete Draft]

∨

[Apply Filters]

FIG. 10

HOME | PROFILE | LOGOUT

My Favorites | Service

My Requests | Create Request | Company Requests | Profile

Preferences | Contacts | Help ?

Create Request

① Open New Account  ② Information Reporting  ③ Review and Submit

⊟ Legal Entity Information:

Legal Entity Name: CED PRODUCTION SUPPORT, Testing Client     Address: 1111 E Main St.
                                                                              Any Town, USA
Tax Identification Number:

⊕ Add Accounts | Search: [        ] 🔍 Clear                                    Compare Options    1 of 1 Accounts ☐  Account Information                               Previous Day Reporting   Current Day Reporting   Statements   Images XXXXXX test
☐  ⤷ ID: XXXXXXX  Currency: USD              ◇              ☒                    ☐              ☐
   Copy From ⤴Clear Add                                                                          Types (0)
                                                                                                 [     ∨]

(0) Accounts Selected

[Edit Selected]

[Save Draft] [Cancel]                                                              [<< Previous] [Next >>]

My Favorites | Service

[ Create Request ] Company Requests  Profile

Create Request

⊟ Legal Entity: CED PRODUCTION SUPPORT, TESTING CLIENT | TAX ID: Change

Open New Account

Account Maintenance

Select Maintenance Item — 1402
General Account Maintenance (Clear All)
○ Address & Statement Maintenance
☑ Address Maintenance ⓘ
☑ Statement Maintenance ⓘ
○ Signer Maintenance ⓘ

Add or Update Services

Transaction Research

[ Create Request ]
③ Address Maintenance  ② Statement Maintenance  ③ Review and Submit
⊟ Legal Entity Information
Legal Entity Name: CED PRODUCTION SUPPORT, Testing Client
Tax Identification Number:
Address: 123 Main St.
Any Town, USA

— 1404

[ Cancel ]    [ Next >> ]

HOME | PROFILE | LOGOUT

Preferences | Bank Contacts | Help ⓘ

FIG. 14

My Favorites | Service

[ Create Request ] Company Requests   Profile

Create Request

Legal Entity: CED PRODUCTION SUPPORT, TESTING CLIENT / TAX ID: Change

HOME | PROFILE | LOGOUT

Preferences | Bank Contacts | Help ⓘ

Select Maintenance Item

General Account Maintenance (Clear All)
○ Address & Statement Maintenance ⓘ
  Address Maintenance ⓘ
  Statement Maintenance ⓘ
◉ Signer Maintenance ⓘ —1502

Open New Account

Account Maintenance

Add or Update Services

Transaction Research

Required Documents (1) —1504
Please click on document link to download file. Sign as required then browse for the file and attach. In addition please attach all other req

| Status | Request Type | Document Type | Download All |
|--------|--------------|---------------|--------------|
| ⚠ | Signer Maintenance | Signature Card Document XXXXXX | |

[ Cancel ]                                                                 [ Next >> ]

My Favorites  My Requests  Reporting  Create Request  Service  Approvals  Company Requests  Bank Profile

HOME | PROFILE | LOGOUT

1902 — Preferences  Contacts | Help ?

Service Center Preferences

Categories
General Settings
General Preferences settings for alerts and landing page

General Settings   1904

Send Me Alerts On: ?
☑ Rejected Requests      ☑ Approval Required      ☑ Action Required
☐ Approved Requests      ☑ Standard Alert          ☑ Standard Alert
☐ Request Completed      ☐ Reminder Alert          ☐ Reminder Alert
☑ Request Reassigned     Send Every [ ∨ ]          Send Every [ ∨ ]
☐ Request Cancelled              1906

Set my default landing page: ?
◉ My Requests       ○ Approvals        ○ Profile
○ Create Requests   ○ Company Requests

[Submit]  Reset

Service Center

Take it out for a test drive with our self-guided virtual demonstration

FIG. 19

METHODS AND APPARATUS FOR PROVIDING VIABLE LANDING SITES FOR A MOBILE DEPLOYMENT OF, INTER ALIA, AN INTERACTIVE HIERARCHICAL ENTITLEMENT FEATURE

CROSS-REFERENCE TO RELATED APPLICATION

This application is a continuation-in-part application of non-provisional U.S. patent application Ser. No. 14/615,493, entitled, "METHOD AND APPARATUS FOR PROVIDING AN INTERACTIVE HIERARCHICAL ENTITLEMENT MAP".

FIELD OF TECHNOLOGY

This application relates to providing robust systems for display of, inter alia, interactive hierarchical entitlement features.

BACKGROUND OF THE DISCLOSURE

Hierarchical maps may be used to show entity and/or employee hierarchies.

Entity hierarchies, hierarchical maps and entity entitlement enforcements—i.e., restricting information access only to authorized parties—may be some of a number of features that are used in certain applications such as entity treasury applications. Such features may include responding to client requests, opening new accounts with pre-determined characteristics, reviewing and submitting such opened accounts for approval, maintaining such accounts or other accounts where such maintenance relates to address identification or statement maintenance or authorized signer maintenance on such accounts, adding services for such accounts, enabling users to select landing sites for clients and enabling users to add or modify services related to such accounts.

It would be desirable to combine all or at least many of the features set forth above into a preferably single, interactive and robust application in order to overcome efficiency issues attendant to using the various features in disparate applications.

It would also be desirable to support interactivity between the features.

SUMMARY OF THE INVENTION

A method for providing viable landing sites for a mobile deployment of an interactive hierarchical entitlement map disclosed herein. The method may include inventorying a list of possible landing sites—i.e., interactive web browser pages displayed upon opening an application—for deploying the map on a mobile platform. The method may also include determining which of the inventoried landing sites requires, upon deployment, a connection to an Oracle database. The method may eliminate any member of the list of possible landing sites that requires, upon deployment, a connection to the Oracle database from the list of possible landing sites. Following the eliminating, the method may provide a user, via a graphical user interface ("GUI"), a selection capability to select one of the list of possible landing sites as a default landing site for the deploying the mobile platform. The method may also include querying a list of entitlements for a client. The method may also display the list of entitlements for the client. The list may include a list of signatories with entitlement authorization. The method may further include receiving, from the client, entitlement authorization for a signatory and adding the signatory to the list. The method may link the signatory to one or more signature documents associated with the signatory's authorization. When the method receives a modification to the client information, the method may transmit the modification, independent of any human input, to a System of Record. Such transmission may occur preferably only if the modification is input by the signatory. Preferably thereafter, the method may transform, when received by the System of Record, the modified client information into updated client information reflecting the modification.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows a user profile according to certain embodiments;

FIG. 8 shows a first listing of account details according to certain embodiments;

FIG. 9 shows an informational screen that is responsive to a selection of a "My requests" tab;

FIG. 10 shows an informational screen that is responsive to a selection of a "company requests" tab according to certain embodiments;

FIG. 12 shows an array of information reporting options;

FIG. 13 shows an account review and submit screen according to certain embodiments;

FIG. 14 shows an account maintenance screen according to certain embodiments;

FIG. 15 shows the account maintenance screen shown in FIG. 14 where the user has selected signer maintenance according to certain embodiments;

FIG. 16 shows a screen for adding or updating services according to certain embodiments;

FIG. 17 shows a transaction research screen according to certain embodiments;

FIG. 18 shows an approval screen according to certain embodiments;

FIG. 19 shows an alerts and landing page setting screen according to certain embodiments;

DETAILED DESCRIPTION OF THE DISCLOSURE

Figure 1:
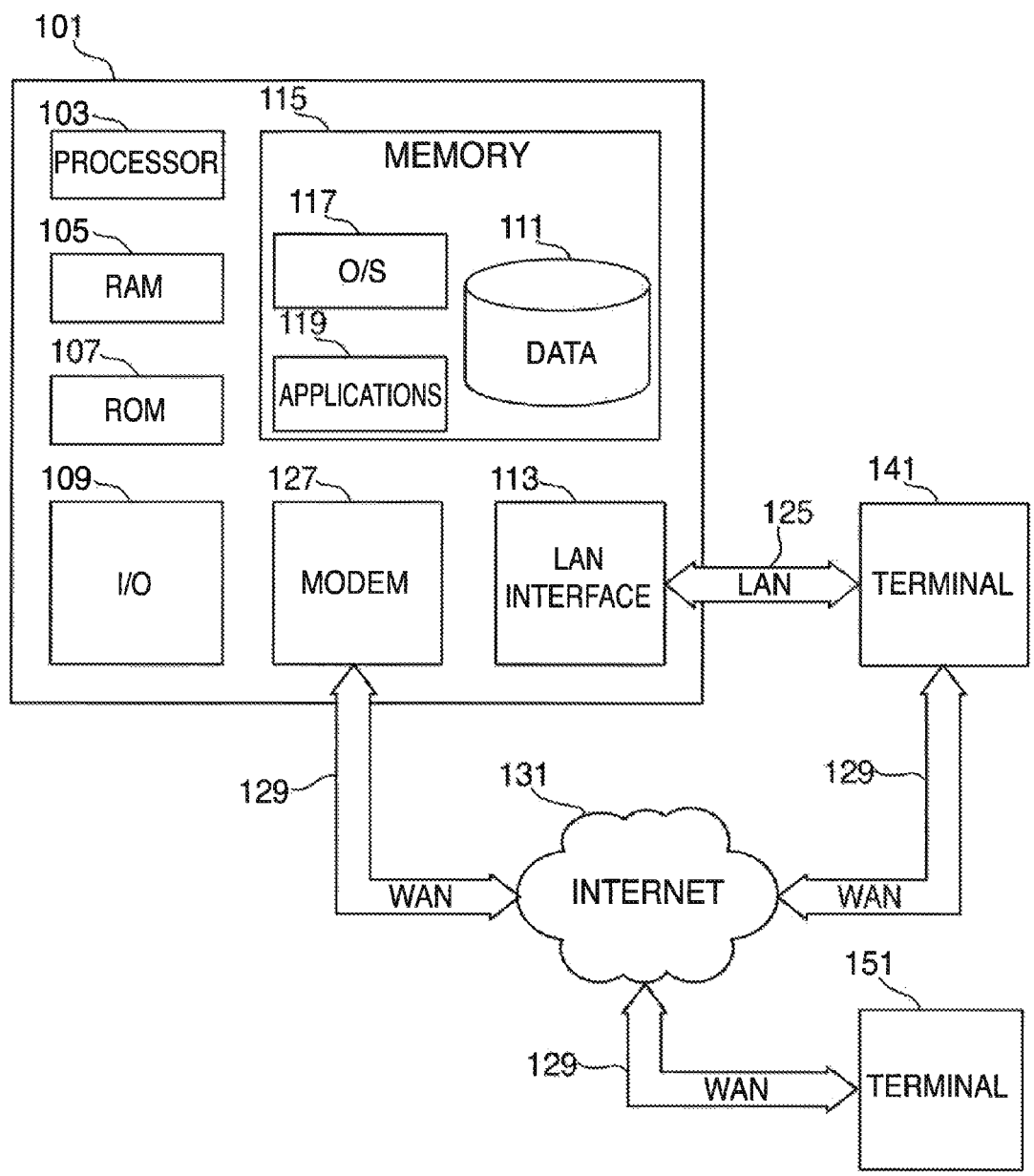
FIG. 1 shows an illustrative apparatus in accordance with principles of the invention.

Apparatus, methods and media (collectively referred to herein as a "system") for deploying a hierarchal client entitlement map, among other features, are provided.

For the sake of illustration, the invention will be described as being performed by a "system." The "system" may include one or more of the features of the apparatus and methods that are shown or described herein and/or any other suitable device or approach. The "system" may be provided by an entity. The entity may be an individual, an organization or any other suitable entity.

The system may inventory a list of possible landing sites for deploying a mobile platform for the hierarchal client entitlement map or other features. The system may then determine which of the inventoried landing sites requires, upon deployment, a connection to an Oracle database. The system may eliminate any member of the list of possible landing sites that requires, upon deployment, a connection to the Oracle database from the list of possible landing sites. Following the eliminating, the system may provide a user, via the GUI, a selection capability to select one of the list of possible landing sites as a default landing site for the deploying the mobile platform.

Preferably before the system has landed on the landing site of choice of the user, the system may query a list of entitlements. The list may include a list of signatories with entitlement authorization. The entitlements may include entitlements for the user or client. The list may be a list for a client.

The system may display the list. The list may be displayed for the client. The list may include a list of signatories. The signatories may include signatories with authorization. The authorization may include entitlement authorization.

The system may receive authorization. The authorization may be received from the client. The authorization may be entitlement authorization for a signatory. The system may add the signatory to the list.

The system may link the signatory. The signatory may be linked to one or more documents. The documents may be signature documents. The signature documents may be associated with the signatory's authorization.

The system may receive a modification. The modification may be a modification to information. The information may be client information.

The system may transmit the modification. The modification may be transmitted if the modification is input by the signatory. The modification may be transmitted only if the modification is input by the signatory. The modification may be input independent of any input. The modification may be transmitted to a System of Record. The modification may be transmitted to the System of Record without any human input.

The system may transform the modified client information. The system may transform the information upon receipt by the System of Record. The information may be transformed into updated client information. The updated information may reflect the modification.

The signatory may be a first signatory. The first signatory may be provided with an entitlement level. The entitlement level may be a first entitlement level. The first entitlement level may correspond to the first signatory.

The signatory may be a second signatory. The second signatory may be provided with an entitlement level. The entitlement level may be a second entitlement level. The second entitlement level may correspond to the second signatory.

The first signatory may be identified on the list of signatories. The second signatory may be identified on the list of signatories. The first signatory and/or the second signatory may be identified on the list of signatories as authorized to modify documents. The documents may be client documents.

The signatories may be identified on the list of signatories as authorized to submit changes. The changes may include changes to documents. The documents may include client documents.

The modification to the documents may be transmitted using any known and available methods. The modification to the documents may be transmitted using Straight Through Processing. The modification may be transmitted without human intervention.

The client information may be transmitted in any suitable form. The client information may be transmitted in batch form. The client information may be transmitted in paragraph form.

The system may be configured for providing signatory maintenance.

The system may display a list. The list may be a hierarchal list. The hierarchal list may be a list of signatories. The list of signatories may include at least one authorization. The authorization may be an entitlement authorization.

The system may receive a modification. The modification may be received from the client. The modification may include a modification at least one entitlement authorization.

The system may extract a signature. The signature may be extracted from one or more documents. The documents may be client documents. The signature may be a signature of a signatory. The signatory may be associated with entitlement authorization. The signatory may have previously been granted entitlement authorization.

The system may include a Graphical User Interface ("GUI"). The system may include a display. The system may display signatory information upon the GUI.

The system may hover over signatory information on the GUI. The system may hover over the signatory on the GUI.

The system may display information on the display. The display may be a hierarchal display. The information may be displayed on the hierarchal display in response to the hovering.

The system may display a copy of the signature of the signatory. The copy of the signature of the signatory may be displayed in response to the system hovering over the signatory on the GUI.

The system may display a list. The list may be a list of signatories. The list of signatories may be a hierarchal list of signatories. The list of signatories may include signatories with authorization. The authorization may be entitlement authorization. The entitlement authorization may be current entitlement authorization. The hierarchal list of signatories may be displayed in response to the system hovering over the signatory on the GUI.

The system may display a listing of documents. The listing of documents may be a list of documents signed by a signatory. The listing of documents may be a list of all documents signed by a signatory. The listing of documents may include a list of documents signed by each of the signatories. The listing of documents may be displayed in response to the system hovering over the signatory on the GUI.

The system may receive a change. The change may be a change of entitlement. The entitlement may be entitlement for a signatory. In response to a change of entitlement for a signatory, the system may remove the signatory. The signatory may be removed as an authorized signor. The signatory may be removed from an authorized signor database.

The system may include a selectable display. The listing of documents may include the selectable display. The selectable display may include a display of documents signed by the signatory.

An exemplary embodiment is now provided. The system may provide a hierarchal entitlement map. The system may query a list. The list may include a list of entitlements. The list may be a list for a client. The entitlements may include client entitlements.

The system may include a display. The display may be configured to display the list. The list may be displayed for the client. The list may include a list of signatories. The signatories may be granted authorization. The authorization may include entitlement authorization.

The system may receive entitlement authorization. The authorization may be an authorization of entitlement for a signatory. The authorization may be received from the client.

The system may receive a request. The request may include a request to add the signatory. The request may include a request to add the signatory to the list.

The system may receive a modification. The modification may include a modification to the client information.

The system may transmit the modification. The modification may only be transmitted if the modification is input by the signatory. The modification may be transmitted independent of human input. The modification may be transmitted to a System of Record.

The system may link the signatory. The signatory may be linked to one or more signature documents. The one or more signature documents may be associated with the signatory's authorization.

The system may transform the modified client information. The modified client information may be transformed only when received by the System of Record. The modified client information may be transformed into updated client information. The updated client information may reflect the modification.

The signatory may be a first signatory. The signatory may be a second signatory. The signatories may be identified on the list of signatories. The signatories on the list of signatories may be authorized to modify client documents.

The signatories on the list of signatories may be authorized to submit changes to client documents.

The modification to client information may be transmitted using Straight Through Processing. The modification to client information may be transmitted without human intervention.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other devices. These devices may be identical to system 100 or different. The differences may be related to hardware components and/or software components.

Figure 2:
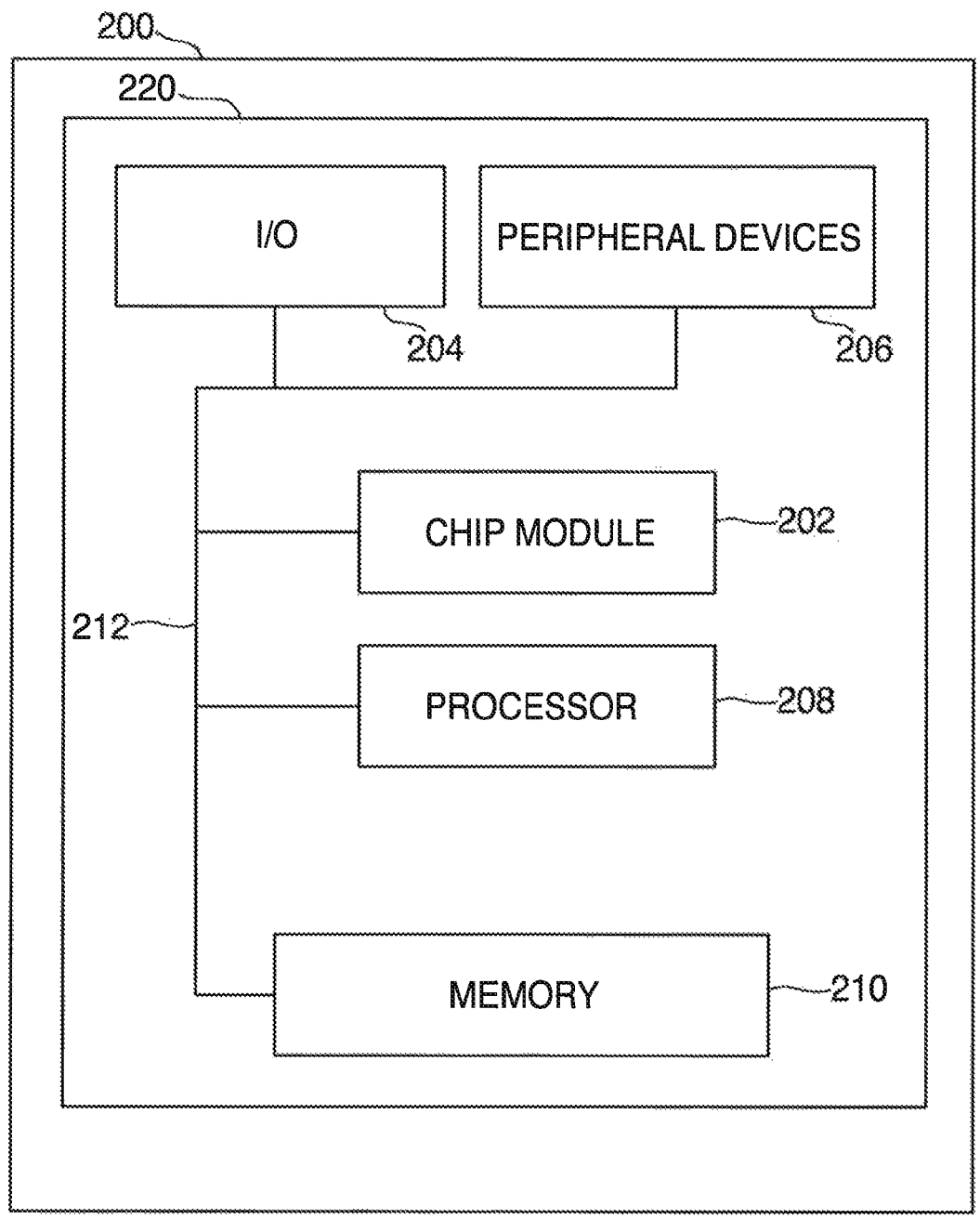
FIG. 2 shows an illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data and/or determine signatory entitlement requirements and machine-readable memory 210.

Machine-readable memory 210 may be configured to store in machine-readable data structures: information pertaining to a signatory, information pertaining to an administrator of the repository and the signatories which he may oversee, the current time, information pertaining to historical entitlements, information relating to current regulations, rules and/or statutes relating to account compliance and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
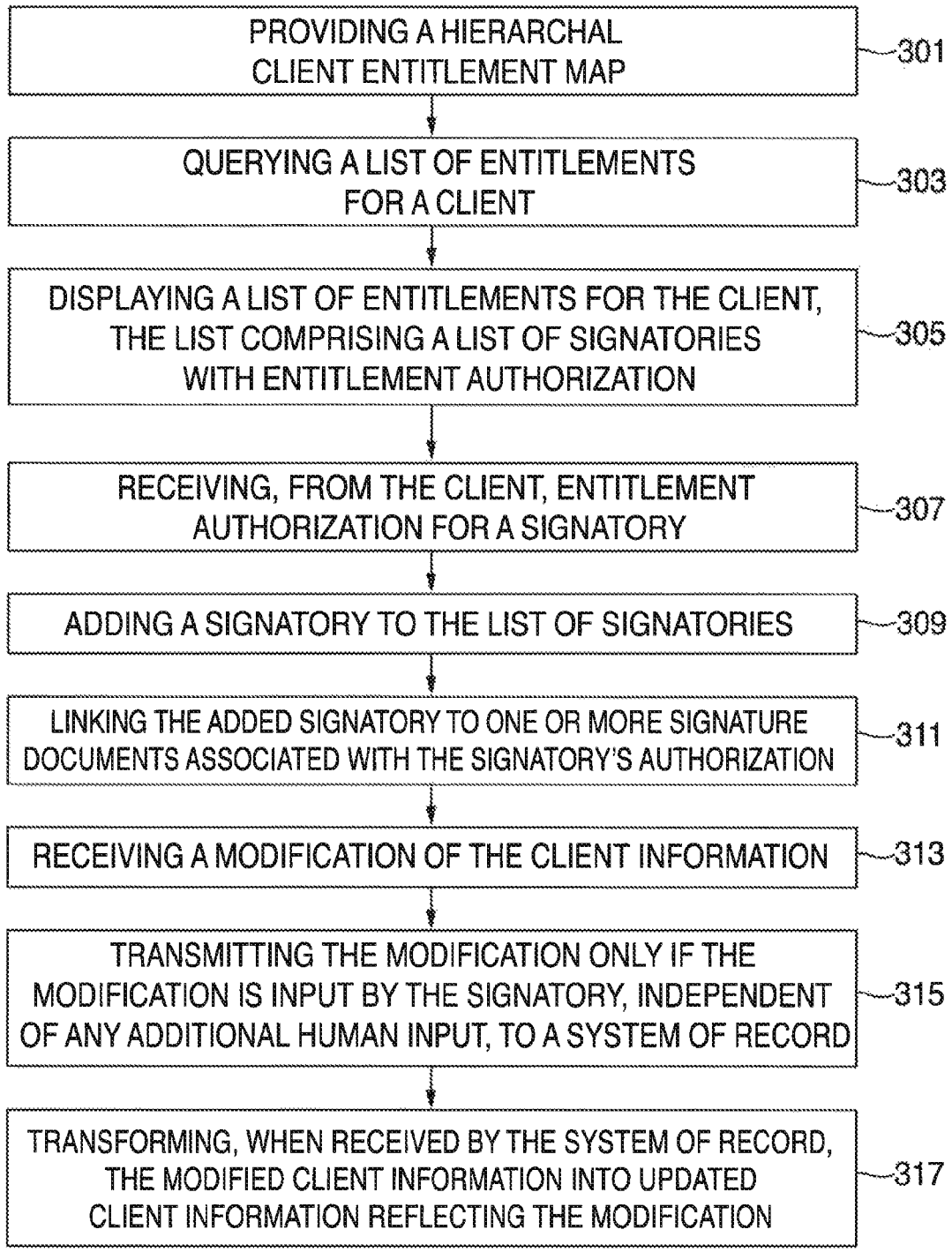
FIG. 3 shows an illustrative flow diagram according to certain embodiments.

FIG. 3 shows illustrative process 301 for providing a hierarchal client entitlement map.

Process 301 for providing a hierarchal client entitlement map may initiate at step 303. At step 303, the system may query a list. The list may include a list of entitlements. The entitlements may be entitlements for a client. The list may be queried for a client.

At step 305, the system may display the list of entitlements. The list of entitlements may be displayed for the client. The list may include a list of signatories. The signatories may be signatories with authorization. The authorization may include entitlement authorization.

At step 307, the system may receive entitlement authorization. The entitlement authorization may be received from the client. The entitlement authorization may be authorization for a signatory.

At step 309, the system may add a signatory to a list of signatories. The signatory may be added to the list.

At step 311, the system may link the added signatory. The added signatory may be linked to one or more signature documents. The one or more signature documents may be associated with the signatory's authorization.

At step 313, the system may receive a modification. The modification may include a modification of client information.

At step 315, the system may transmit the modification. The modification may be transmitted preferably only if the modification is input by the signatory. The modification may be transmitted independent of any additional human input. The modification may be transmitted to a System of Record.

At step 317, the system may transform the client information. The system may transform the client information into modified client information. The system may transform the information when received by the System of Record. The system may transform the information into updated client information. The updated client information may reflect the modification.

Figure 4:
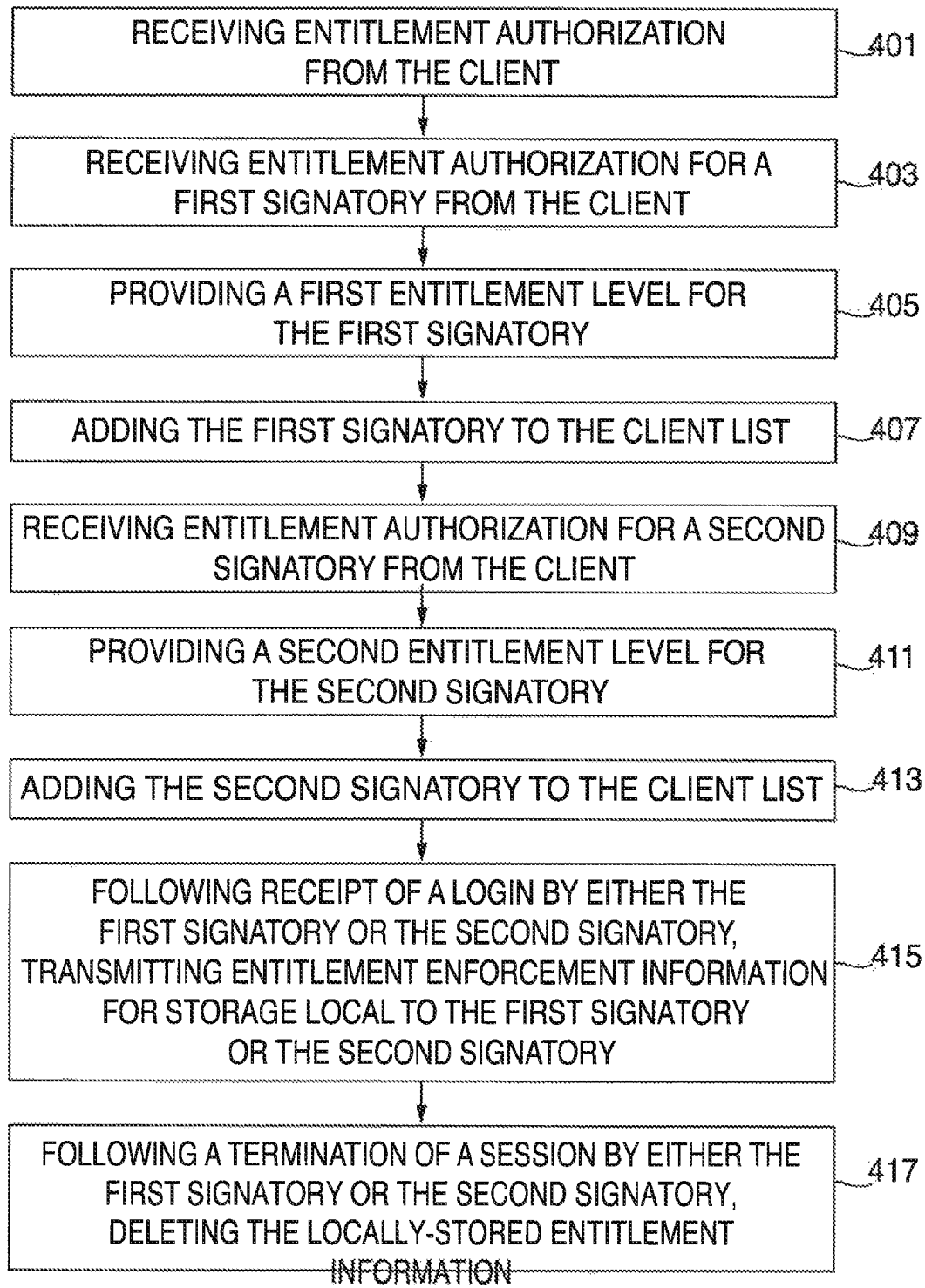
FIG. 4 shows another illustrative flow diagram in accordance with the principles of the invention.

FIG. 4 shows illustrative process for receiving entitlement authorization from a client.

The process may begin at step 401. At step 401, the system may receive authorization. Authorization may be received from the client. The authorization may be entitlement authorization.

At step 403, the system may receive entitlement authorization. The entitlement authorization may be received for a signatory. The signatory may be a first signatory. The entitlement authorization may be received from the client.

At step 405, the system may provide an entitlement level. The entitlement level may be a first entitlement level. The entitlement level may be associated with the first signatory. The first entitlement level may be the entitlement level of the first signatory.

At step 407, the system may add the first signatory to the client list.

At step 409, the system may receive entitlement authorization. The authorization may correspond to a second signatory. The authorization for the second signatory may be received from the client.

At step 411, the system may provide a second entitlement level. The second entitlement level may be associated with the second signatory. The second entitlement level may be the entitlement level of the second signatory.

At step 413, the system may add the second signatory the client list.

Following receipt of a login by either the first signatory or the second signatory, step 415 shows transmitting entitlement enforcement information for storage local to the first signatory or the second signatory. Step 417 shows following a termination of a session by the logged-on first signatory or the second signatory, deleting the locally-shared entitlement information.

Figure 5:
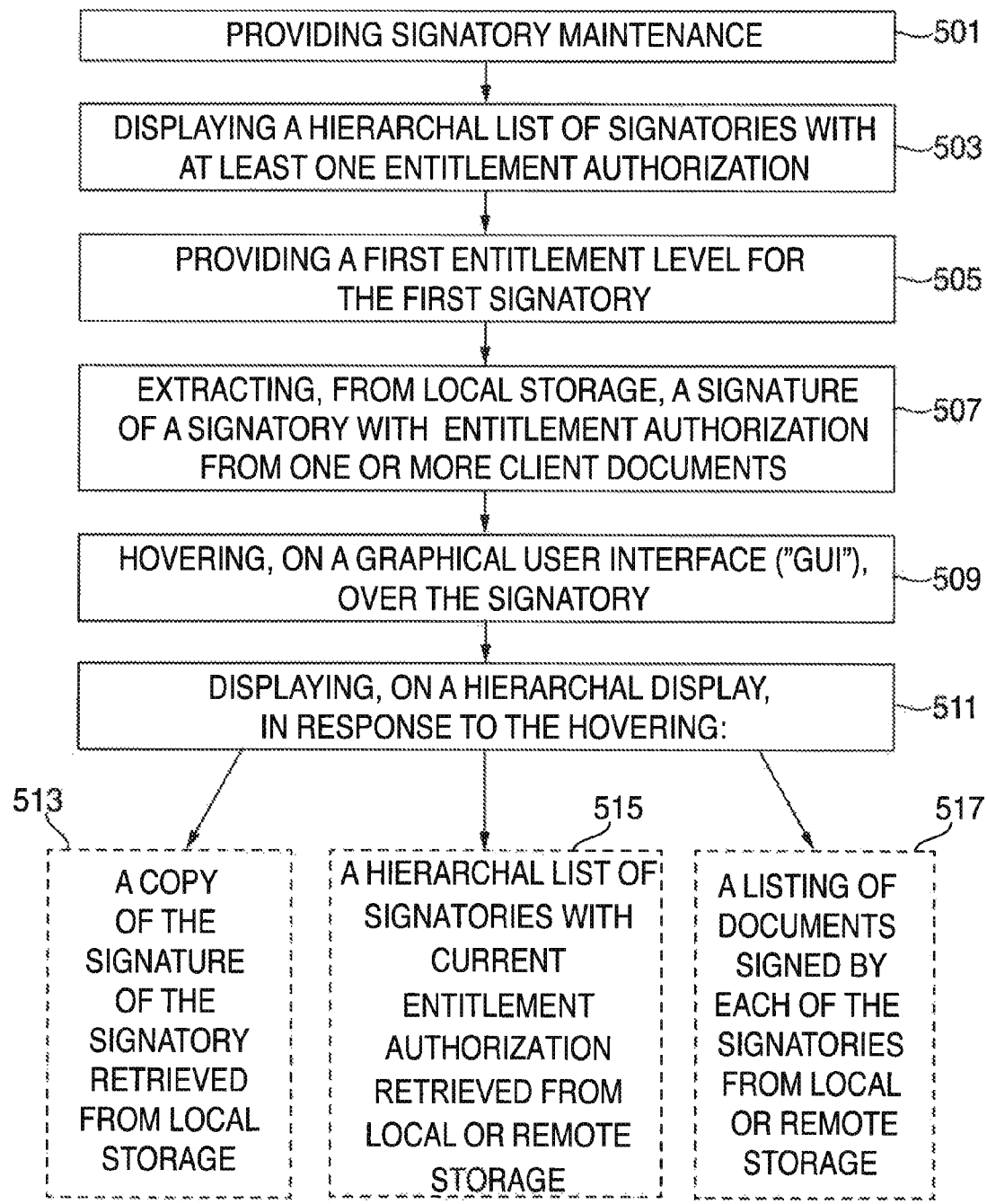
FIG. 5 shows yet another illustrative flow diagram in accordance with the principles of the invention.

FIG. 5 shows illustrative process 501 for providing signatory maintenance.

Process 501 may begin at step 503. At step 503, the system may display a list. The list may be a hierarchal list. The list may be a list of signatories. The signatories may be associated with at least one authorization. The authorization may include entitlement authorization.

At step 505, the system may provide an entitlement level. The entitlement level may be a first entitlement level. The entitlement level may be an entitlement level for a first signatory.

At step 507, the system may extract, preferably from local storage (but possibly also from remote storage), a signature. The signature may be the signature of a signatory. The signatory may have entitlement authorization. The signatory signature may be extracted from one or more documents. The documents may be client documents.

At step 509, the system may include a GUI. The GUI May display information. The GUI may display a pointer. The pointer may hover. The pointer may hover over the signatory information. The pointer may be displayed on the hierarchal map. The pointer may be displayed hovering over the signatory within the hierarchal map.

At step 511, the system may display information on a hierarchal map display. The information may be displayed in response to the hovering.

At step 513, the system may display a signature. The signature may be a copy of a signature. The signatory may be the signature of a signatory. The signatory may be the stored signature of a signatory. The signature may be retrieved from local storage.

At step 515, the system may display a list. The list may be a hierarchal list. The hierarchal list may be a list of signatories. The list may include a list of signatories with entitlement authorization. The entitlement authorization may be current entitlement authorization. The hierarchal list may be retrieved from local storage.

At step 517, the system may display a listing of documents. The listing may include documents signed by each of the signatories. The listing of documents may be retrieved from local storage.

It should be noted that the information that is displayed in response to the hovering, such as the information in any one of steps 513, 515 and/or 517 may be shown in the alternative—i.e., only the information in one of 513, 515 or 517—or some combination of the information in two or more of 513, 515 or 517 may be shown, without departing from the scope of the invention.

Figure 6:
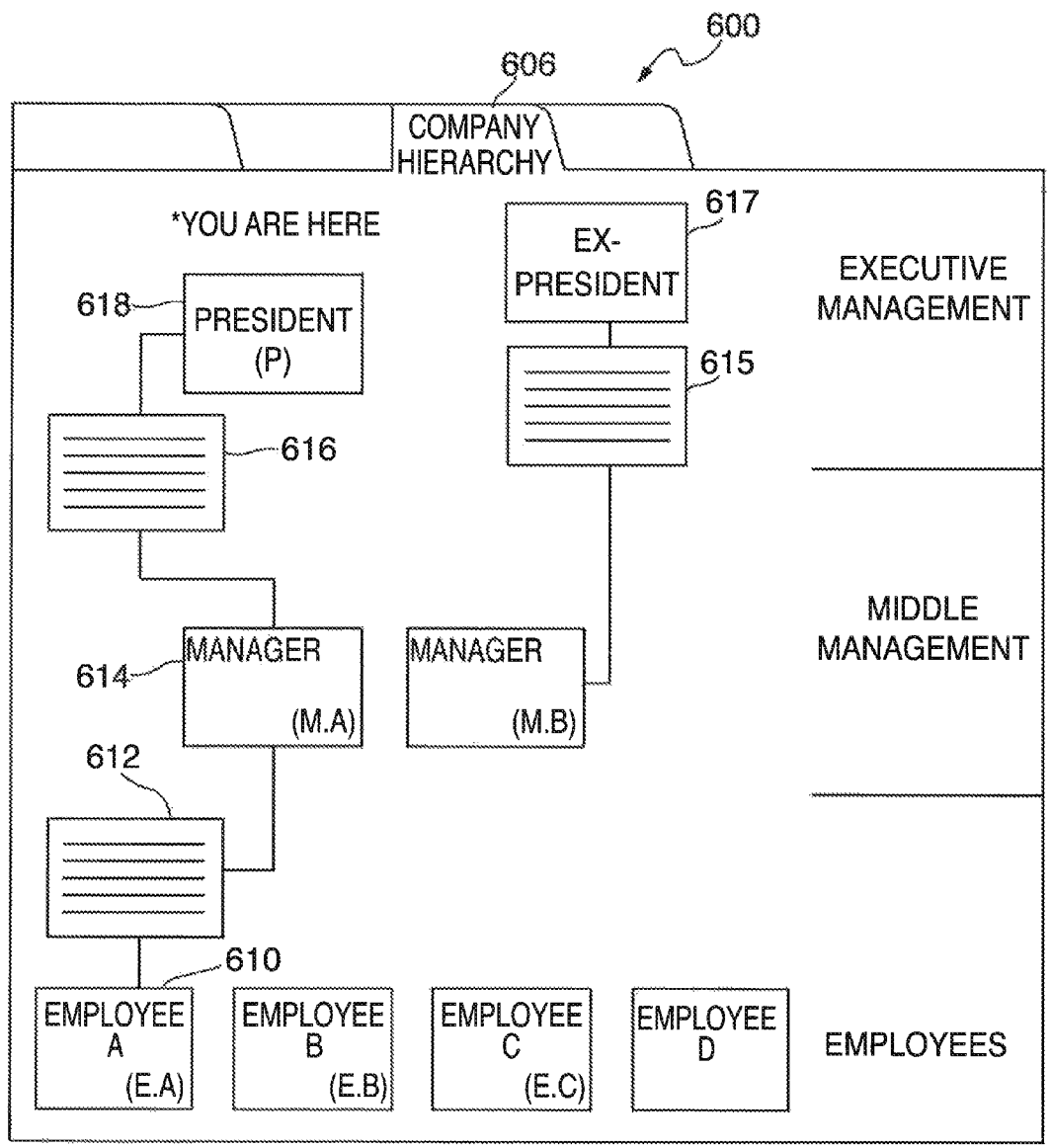
FIG. 6 shows a hierarchical map in accordance with principles of the invention.

FIG. 6 shows an embodiment of an illustrative hierarchal map 600. Map 600 shows an illustrative company hierarchy tab 606.

Map 600 has been divided into three exemplary sections—i.e., executive management, middle management and employees.

President 418 has preferably extended signatory authority for the entity to manager A ("M.A") via document 616. Manager B ("M.B") received signatory authority via document 615 from ex-president 617 who is no longer with the company.

M.A 614 has also extended signatory authority to Employee A ("E.A.") 610 via document 612.

In certain embodiments of the invention, when E.A 610 is removed from signatory authority, the hierarchical map 600 may preferably provide a visual indicator, or plurality of indicators, that E.A 610 derives his authority from M.A 614 and President 618.

Such a chain of authority, as well as the documents upon which the chain is based, may require reexamination in light of selected types of occurrences which caused M.A 610 to lose his signatory authority. For example, if M.A 610 lost his signatory authority because of a fraudulent act, then the chain of authority from which M.A 610 derived his signatory authority may require inspection to insure that M.A 610's fraud was not part of a greater, and more developed fraudulent scheme.

FIGS. 7-19 show a series of user interfaces that may, in certain embodiments, incorporate the disclosure set forth with respect to FIGS. 1-6. Specifically, FIGS. 7-19 may, in certain embodiments, refer to, relate to or otherwise adapt the information shown in FIGS. 1-6, and described in the portion of the specification corresponding thereto.

FIG. 7 shows a user profile 702. User profile 702 presents a consolidated view of accounts 704, services 706 and authorized signatory information 708 (alternatively referred to herein as "signers" or "signatories").

FIG. 7 also enables export of information retrieved in response to a command entered into profile 702, or in response to information retrieved by a command entered into profile 702. Such export 710 may be formatted to export such information as an Excel file (manufactured by Microsoft Corp. of Redmond, Wash.) or in some other suitable file.

Figure 8:
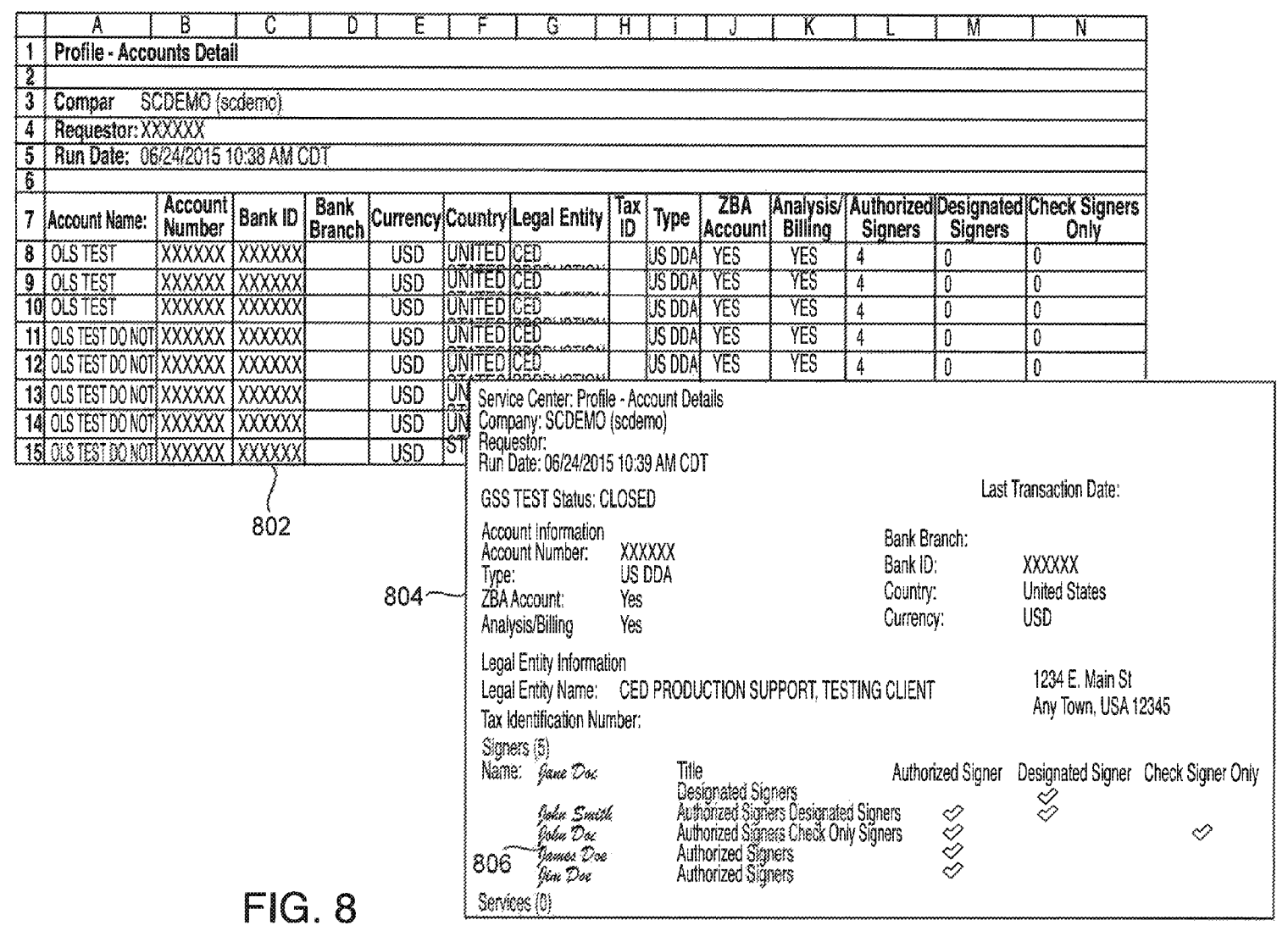

FIG. 8 shows a first listing of account details 802 responsive to a selection of accounts 704 shown in FIG. 7.

FIG. 8 also shows account details 804 which includes signatory information 806. Signatory information preferably embodies methods and apparatus for data warehousing with respect to the interactive hierarchical entitlement map 600 shown in FIG. 6. It should be understood that, while map 600 shows an interactive hierarchical entitlement map 600, data shown in 804 supports such a map.

The signatory information data shown in 804 may preferably provide an interactive pathway to available data relating to an interactive hierarchical entitlement map 600 shown in FIG. 6. For example, a user could preferably leverage signatory information data 804 to as a conduit for changing the data at a system of record level. Accordingly, an entitled user may be able to click on an authorized user shown in 804 and be presented a system of record, interactive, screen for augmenting, adjusting, rejecting or otherwise changing the entitlement level of the selected, previously-entitled authorized user. It should be noted that, because the signatory information data in 804 is interactive, the data pathway between the screen shown in 804 and a system of record of such a screen may preferably be, for the appropriately entitled viewers, bi-directional.

Alternatively, signatory information 804 may be viewed, but not changed, by a user with a different level of entitlement than the first user. As such, signatory information 804 may not be interactive to such a user.

FIG. 9 shows a "My Requests" tab 902. My requests tab 902 preferably provides details and status of a user's requests submitted through a service center. The screen supporting my request tab 902 may preferably be provided pursuant to a selection by a user of services 706 shown in FIG. 7.

It should be noted that requests can be filtered in order to manage the requests more easily. For example, a search for a request may be conducted using search box 904. In some embodiments, a search for a request may be filtered by selecting one of request types 906.

Certain embodiments may identify a communications channel 908 associated with the request. For example, when a user requests, via an online portal, information regarding a missing check, the user request may be indicated as an online request, as shown in FIG. 9. In addition, my requests may also present a status 910 identifier which provides a visual indication of the status of a user request.

FIG. 10 shows a company requests tab 1002. Company requests tab 1002 may enable a user to view all requests regardless of channel. Such a tab is preferably entitlement driven—i.e., a company's requests may preferably be viewable only to the extent the user is entitled to view such requests. Again the channel associated with the request may be visible at entry 1004.

Figure 11:
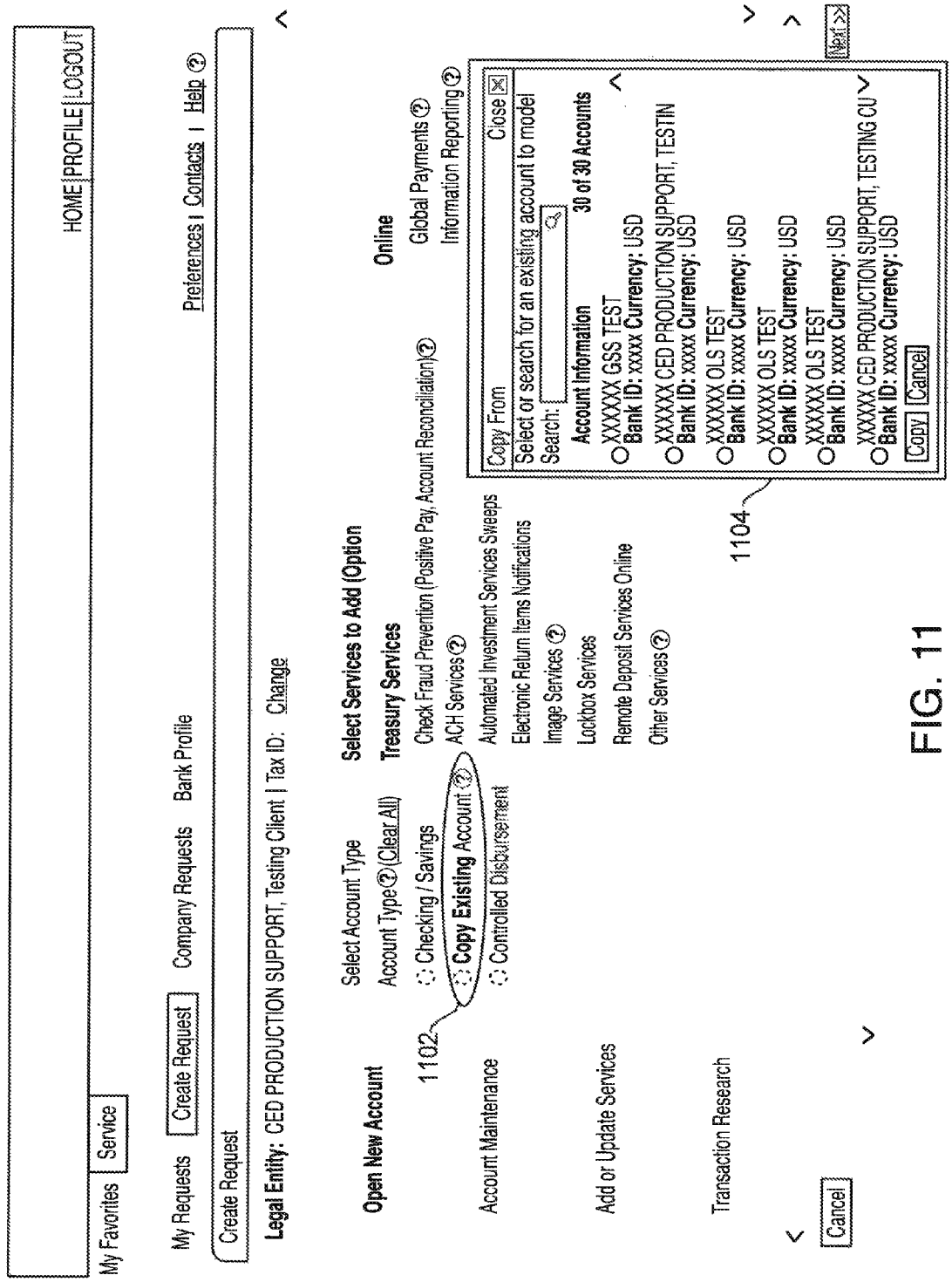
FIG. 11 shows a copy utility for opening an account according to certain embodiments.

FIG. 11 shows a copy utility 1102 within the create requests tab for opening an account. Copy utility 1102 may preferably enable a user to open an account by selecting a legacy account from among a list of legacy accounts, as shown at 1104, and requesting that the new account be opened according to the specifications of the selected legacy account.

FIG. 12 shows an array of information reporting options 1202. Such an array 1202 may preferably enable a user to make any changes necessary for account services.

Figure 13:
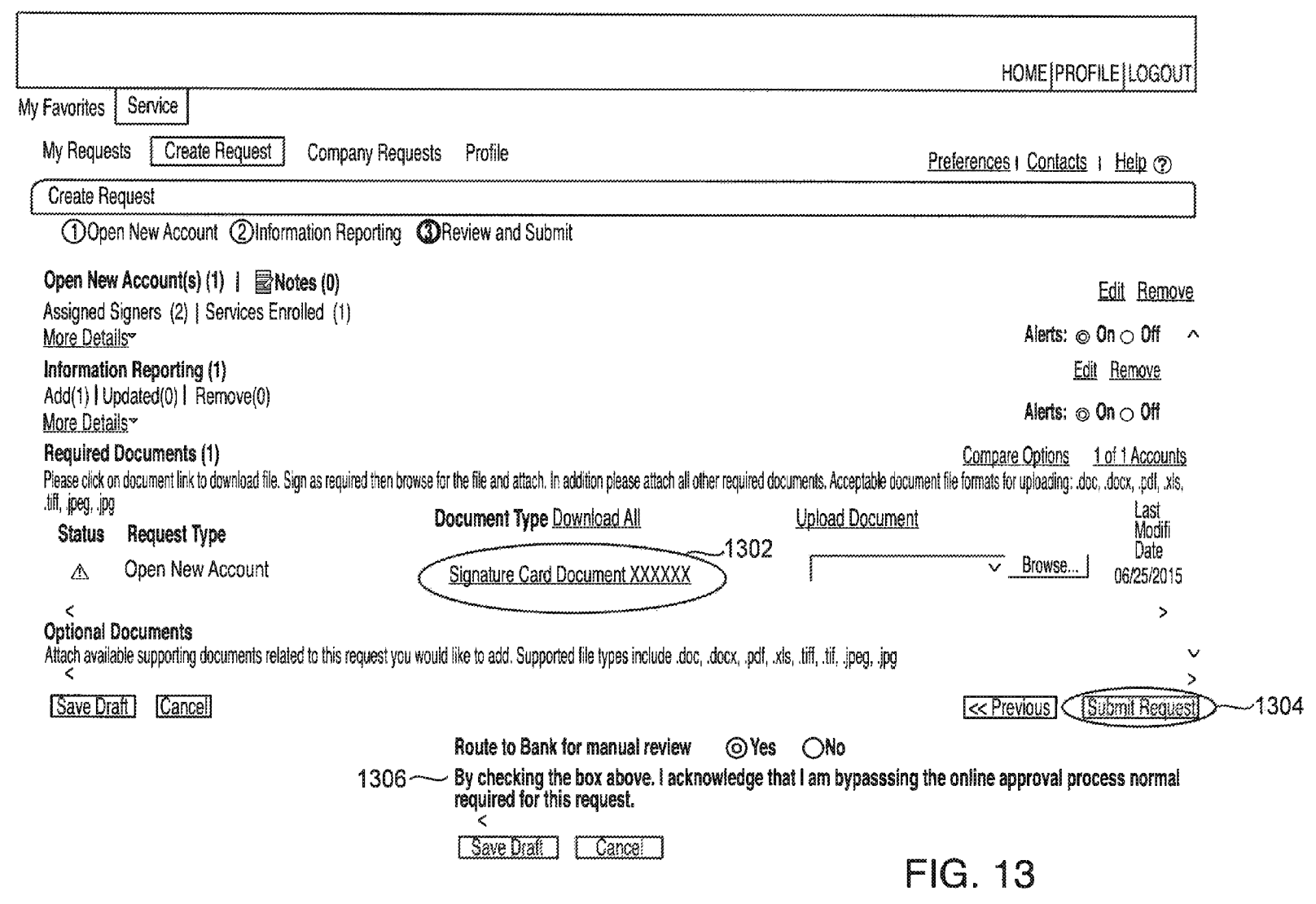

FIG. 13 shows an account review and submit screen. Such a screen may preferably enable a user to browse for and retrieve necessary documentation 1302 for opening the account. A request may be submitted at 1304. FIG. 13 also enables a user, at 1306, to optionally route the account opening request for manual review and approval.

FIG. 14 shows an account maintenance screen. At 1402, the user is preferably enabled to select either address maintenance and statement maintenance or signer maintenance. At step 1404, the user is enabled to interactively change an account address.

FIG. 15 shows the account maintenance screen shown in FIG. 14. Step 1502 shows that the user has selected signer maintenance. At 1504, signer maintenance shows a selectable link to the document associated with the signer designated in the account opening request.

Figure 16:
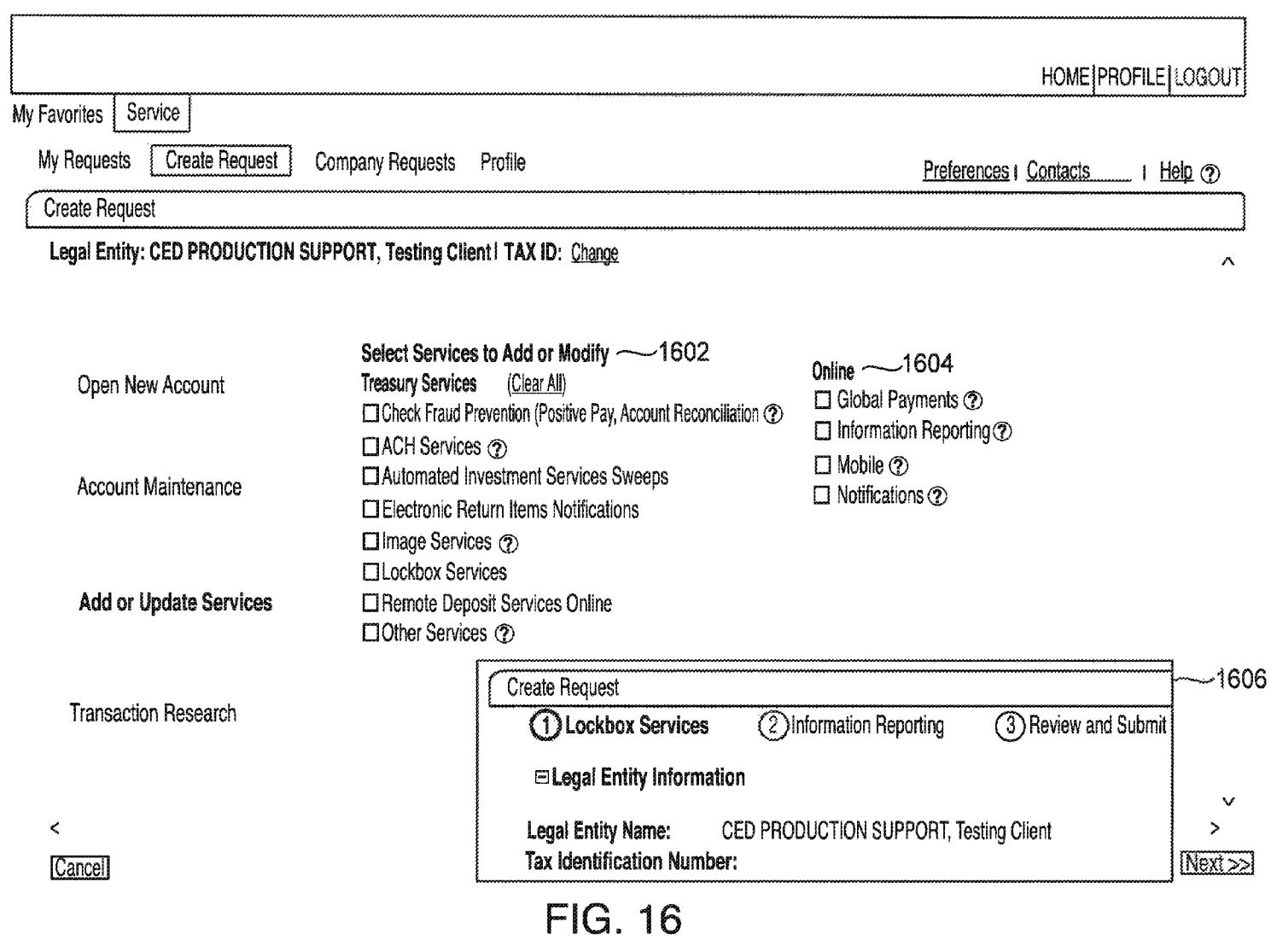

FIG. 16 shows a screen for adding or updating services. The screen preferably includes a list of selectable treasury services at 1602. The screen also preferably includes a list of online services at 1604. Upon selection of one of the list of services at 1602, or 1604, an interactive dialogue box related to the requested service may appear, as shown at 1606.

Figure 17:
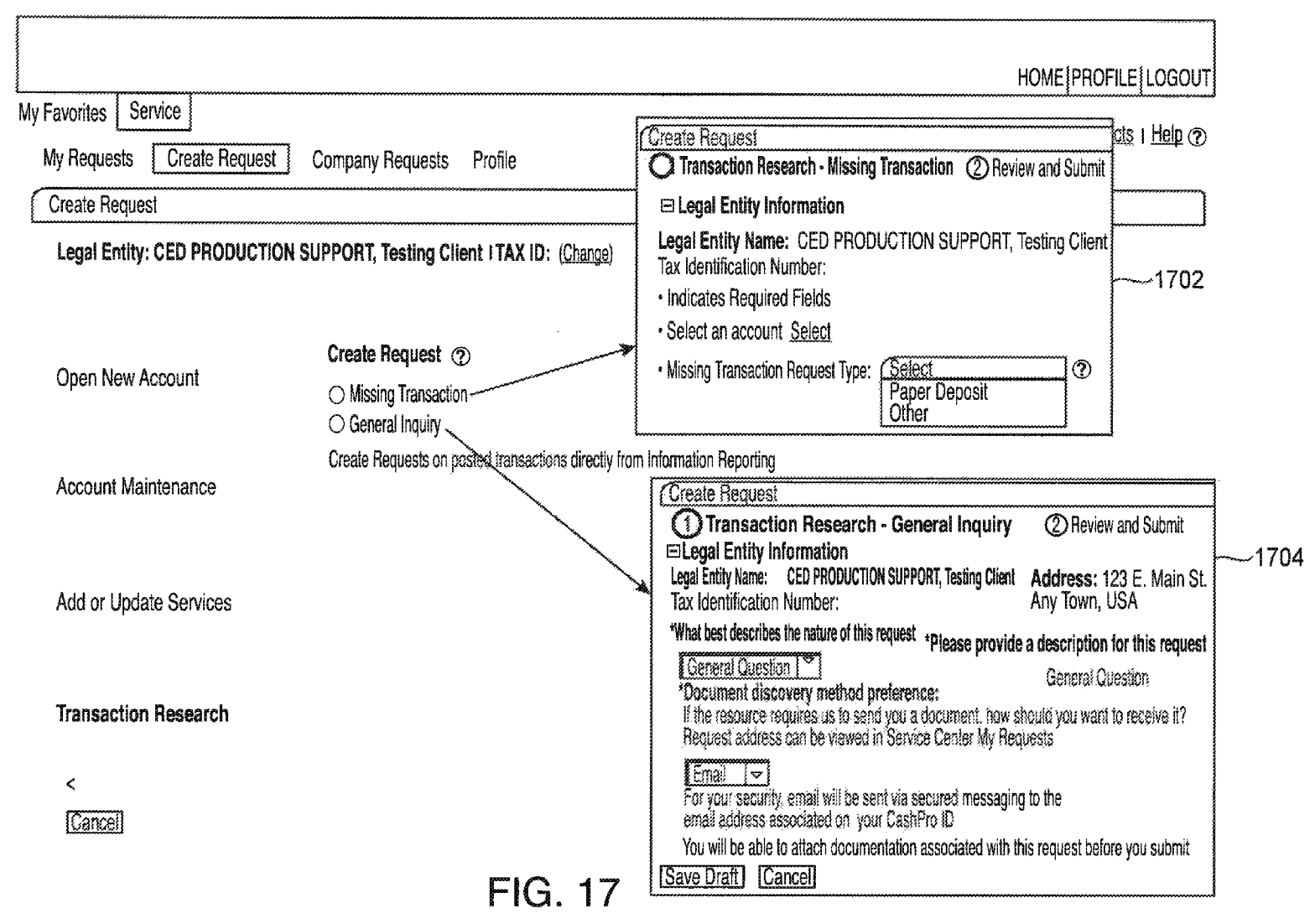

FIG. 17 shows a transaction research screen. The transaction research screen preferably enables a user to request information regarding a missing transaction, as shown at 1702, or submit a general inquiry, as shown at 1704.

Figure 18:
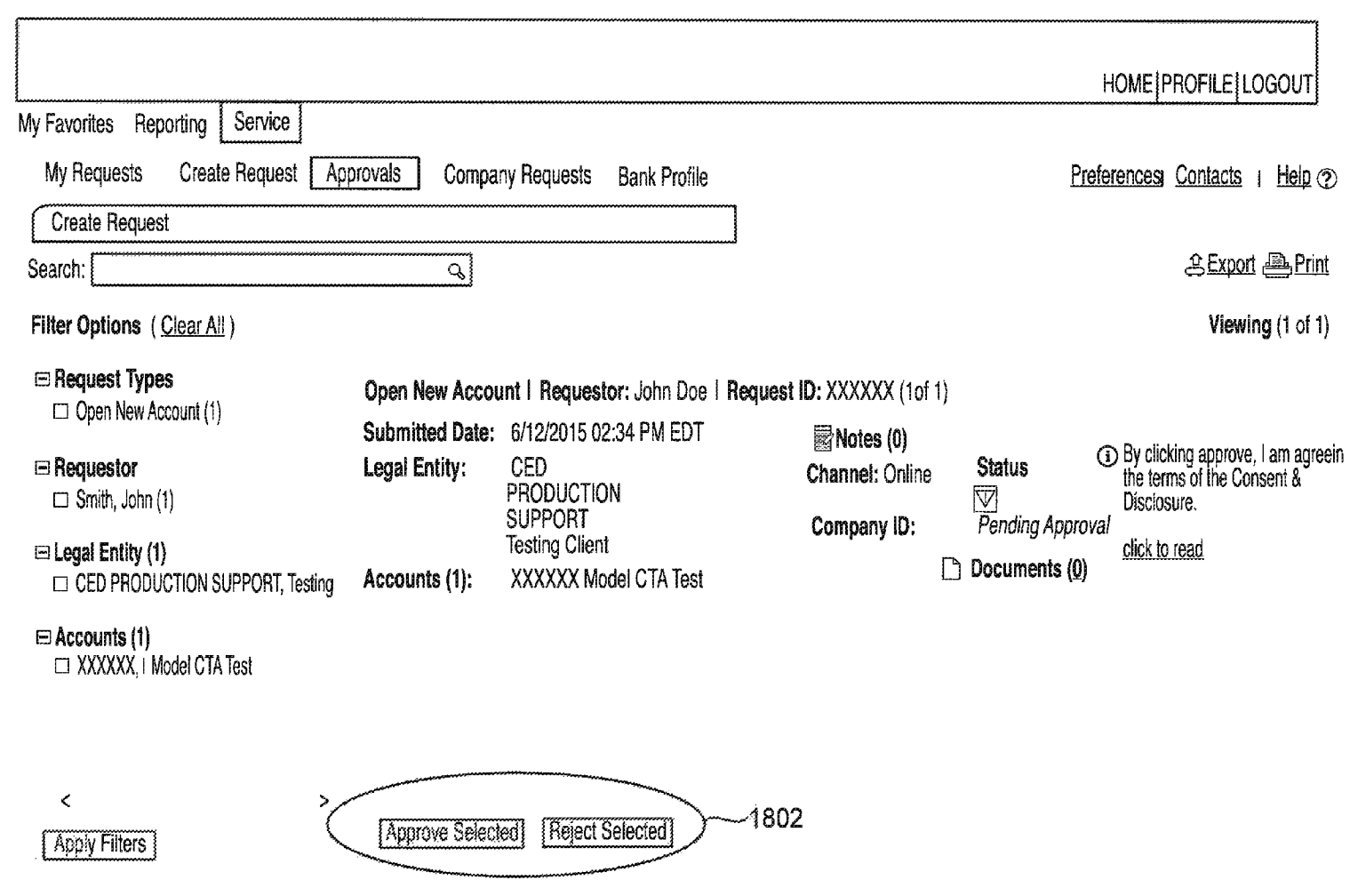

FIG. 18 shows an approval screen. The approval screen in FIG. 18 preferably enables users to approve a selected account opening request, or reject a selected account opening request, as shown at 1802. It should be noted that the account screen in FIG. 18 may preferably only be available to users with the appropriate entitlement—i.e., an entitlement to approve or reject the requested account opening.

FIG. 19 shows an alerts and landing page setting screen. It should be noted that the alerts and landings screen may be available in response to the selection of preferences selector 1902. Alerts request section 1904 enables a user to select one or more alerts regarding various topics. A default landing page may be selected at 1906.

The default landing page may preferably be selectable from a mobile device only to the extent that the default landing page doesn't implicate an immediate Oracle database interaction. To the extent that a landing page implicates an immediate Oracle database interaction, that selection is preferably disallowed. At least one reason for this is that the mobile platform is not sufficiently robust to handle an immediate Oracle database interaction. Specifically, a mobile platform may not support sufficient bandwidth to initiate contact at a screen including an immediate Oracle database interaction. As such, any screen that implicates an immediate Oracle database interaction may preferably be excluded from selections at 1906.

Figure 20:
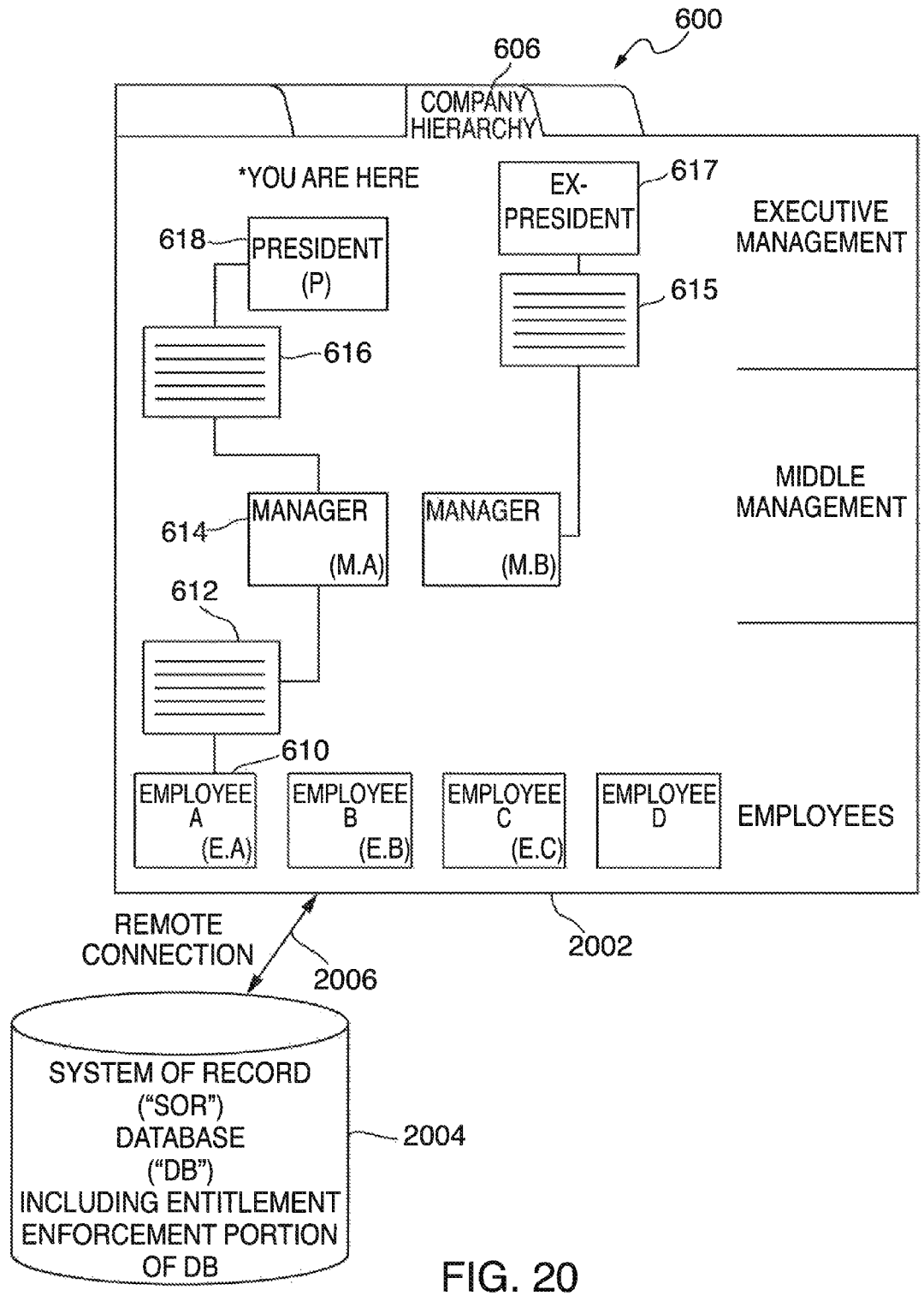
FIG. 20 shows the hierarchical map of FIG. 6 as coupled to a remote system of record database according to certain embodiments.

FIG. 20 shows the interactive hierarchical entitlement map 2002 detailed at FIG. 6. FIG. 20 also shows that map 2002 may be coupled, by connection 2006, to a remote system of record ("SOR") database ("DB") 2004. DB 2004 may preferably include, inter alia, an entitlement enforcement portion of the DB.

It should be noted that the entitlement enforcement portion of DB 2004 typically comprises less than ten percent of the information stored in the DB. For example, if the entire DB comprised 150 columns of information, the entitlement enforcement portion of the DB may include between five and ten columns.

In certain conventional systems, the remote connection to the DB 2004 drained resources and increased latency because of the repeated calls to the DB whenever entitlement information was needed. Further, it should be noted that all the screens shown in FIGS. 7-19 required some level of entitlement information. As such, when DB 2004 is remote, the systems and methods shown in FIGS. 7-19, and described in the portion of the specification corresponding thereto, required near-continuous interaction with remote DB 2004.

Figure 21:
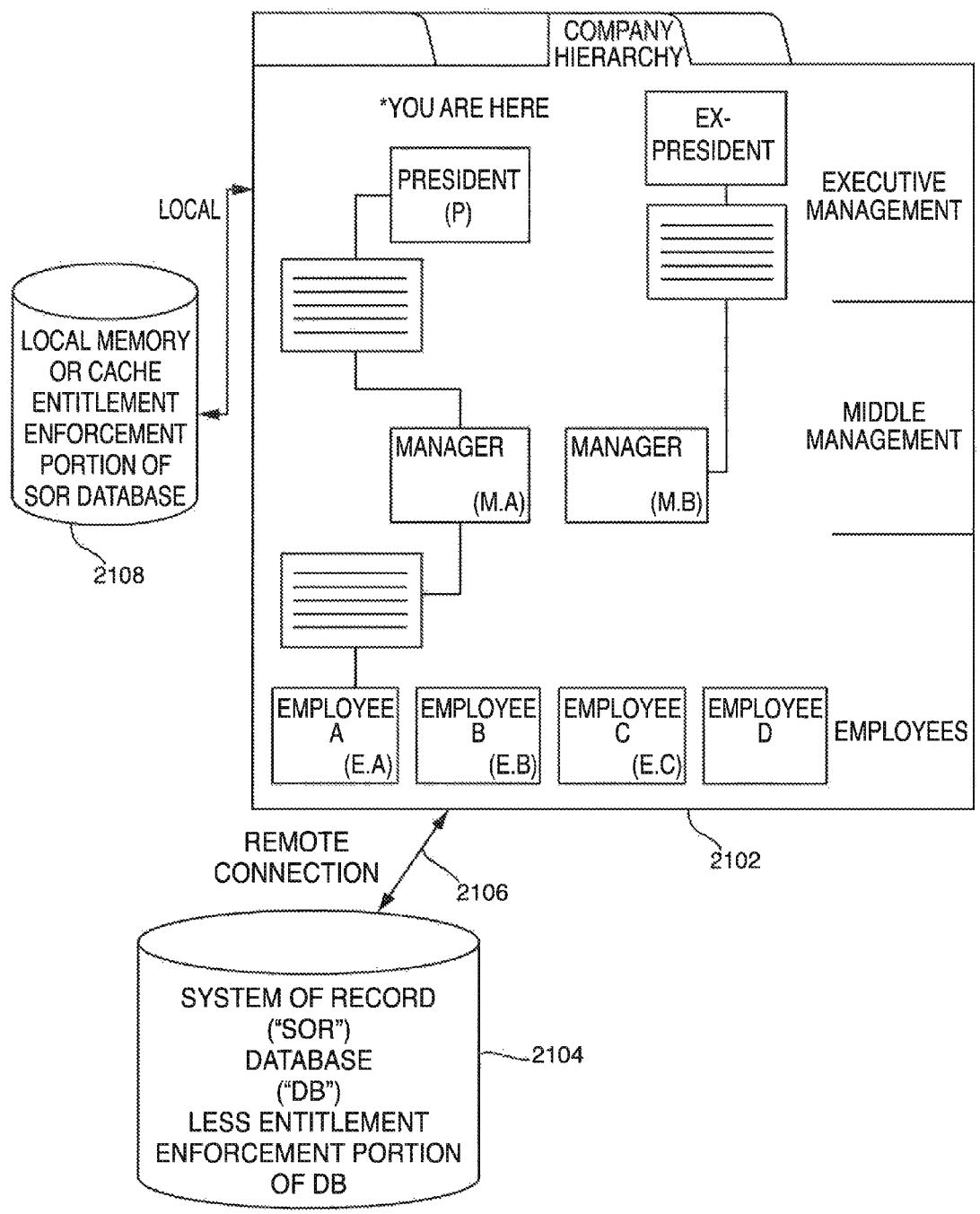
FIG. 21 shows the hierarchical map of FIG. 6 as coupled to a remote system of record database according to certain embodiment, wherein a portion information related to entitlement enforcement is stored locally according to certain embodiments.

FIG. 21 shows a bifurcation of DB 2004 into two component parts—i.e., SOR DB less entitlement enforcement portion of DB 2104 and local memory or cache entitlement portion of SOR DB at 2108. It should be noted that cache entitlement portion of SOR DB at 2108 enables a user to implement the systems and methods shown in FIGS. 7-19 absent a remote interaction. As such all the entitlement-based interactions occur locally and the speed with which the systems and methods may be implemented is greatly improved. Thus, the bifurcation of DB 2004, shown in FIG. 20, into DB 2104 and 2108 shown in FIG. 21 may be understood to be an architecture that greatly enhances the efficacy of the systems and methods shown in FIGS. 7-19, and described in the portion of the specification corresponding thereto.

Figure 22:
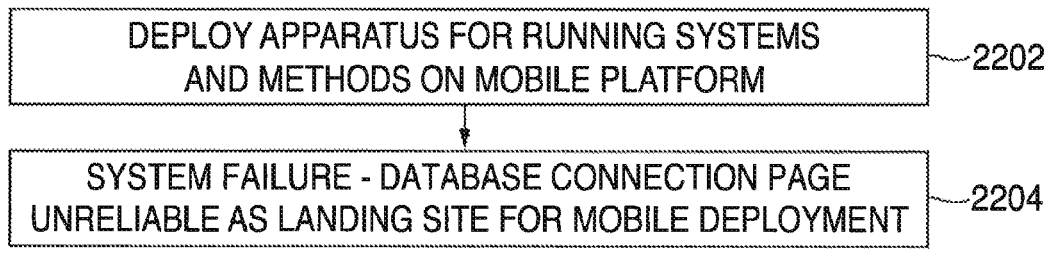
FIG. 22 shows a conventional illustrative flow diagram.

FIG. 22 shows an illustrative flow diagram according to certain conventional embodiments. Step 2202 shows deploying apparatus for running systems and methods on a mobile platform. Step 2204 shows a system failure. The system failure in step 2204 shows that the mobile platform failed because the mobile platform landed on a database connection page. Step 2204 states that the database connection page failed because the database connection page is unreliable as a landing site for mobile deployment at least due to the relatively smaller bandwidth capabilities and the condensed screen associated with typical mobile devices.

Figure 23:
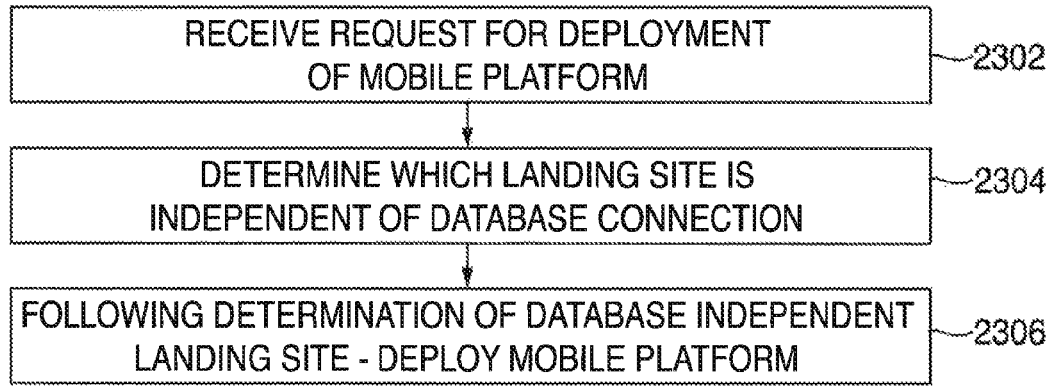
FIG. 23 shows illustrative flow diagram according to certain embodiments.

FIG. 23 shows an illustrative flow diagram according to certain embodiments. Step 2302 shows receiving a request for deployment of the system on a mobile platform. Step 2304 shows determining which landing site is independent of a pre-determined database connection, such as an Oracle database connection. Step 2306 shows, following determination of a predetermined-database independent landing site, deploying the mobile platform.

Thus, methods and apparatus for providing data warehousing with respect to an interactive hierarchical entitlement map are provided. Persons skilled in the art will appreciate that the present invention can be practiced by other than the described embodiments, which are presented for purposes of illustration rather than of limitation, and that the present invention is limited only by the claims that follow.

What is claimed is:
1. A method for providing hierarchal client entitlement information in a graphical user interface ("GUI"), said providing comprising deploying the information on a mobile platform, the method comprising:
  inventorying a list of possible landing sites for deploying the mobile platform;
  determining which of the inventoried landing sites requires, upon deployment, a connection to a database which requires more bandwidth to initiate the connection than the mobile platform can support;
  eliminating any member of the list of possible landing sites that requires, upon deployment, a connection to the database from the list of possible landing sites;
  following the eliminating, providing a user, via the GUI, a selection capability to select one of the list of possible landing sites as a default landing site for the deploying the mobile platform;
  querying a list of entitlements for a client, said list of entitlements comprising a list of signatories with entitlement authorization;
  displaying the list of entitlements for the client;
  receiving, from the client, entitlement authorization for a single signatory;
  adding the single signatory to the list of signatories;
  linking the single signatory to one or more signature documents associated with the single signatory's authorization;
  receiving a modification of client information associated with the client;

transmitting, only if the modification is input by the single signatory, the modification independent of any human input to a System of Record; and transforming, when received by the System of Record, the modified client information into updated client information reflecting the modification.

2. The method of claim 1, wherein the single signatory is a first signatory, the method further comprises:
providing, for the first signatory, a first entitlement level; and
providing, for a second signatory, a second entitlement level.

3. The method of claim 1 wherein the signatories identified on the list of signatories are authorized to modify client documents.

4. The method of claim 1 wherein the map is configured to support interactive pathway to available data relating to an interactive hierarchical entitlement map.

5. The method of claim 1 wherein the modification is transmitted using Straight Through Processing.

6. The method of claim 1 wherein the modification is transmitted independent of human intervention.

7. The method of claim 1 further comprising transmitting client information in paragraph form.

8. A method for providing signatory maintenance, the method comprising:
inventorying a list of possible landing sites for deploying a mobile platform;
determining which of the inventoried landing sites requires, upon deployment, a connection to a database which requires more bandwidth to initiate the connection than the mobile platform can support;
eliminating any member of the list of possible landing sites that requires, upon deployment, a connection to the database from the list of possible landing sites;
following the eliminating, providing a user, via a graphical user interface ("GUI"), a selection capability to select one of the list of possible landing sites as a default landing site for the deploying the mobile platform;
displaying a list of signatories with at least one entitlement authorization;
receiving, from a client, a modification to the at least one entitlement authorization;
extracting, from one or more client documents, a signature of a single signatory with entitlement authorization; and
receiving a user input signal, said user input signal corresponding to a user input device hovering, on the GUI, over the signatory;
displaying, on a hierarchal display, in response to the hovering:
a copy of the signature of the single signatory;
a hierarchal list of signatories with current entitlement authorization; and
a listing of documents signed by each of the signatories.

9. The method of claim 8 further comprising receiving a change in entitlement for the single signatory.

10. The method of claim 9, wherein, in response to the change in entitlement for the single signatory, the method further comprises removing the single signatory as an authorized signor.

11. The method of claim 8 wherein the listing comprises a selectable display of documents signed by the single signatory.

12. The method of claim 8 wherein the map is configured to support an interactive pathway to available data relating to the interactive hierarchical entitlement map.

13. An apparatus for deploying a hierarchal client entitlement map on a mobile platform, the apparatus comprising:
a processor configured to:
inventory a list of possible landing sites for deploying the mobile platform;
determine which of the landing sites on the list of possible landing sites requires, upon deployment, a connection to a database which requires more bandwidth to initiate the connection than the mobile platform can support;
eliminate any member of the list of possible landing sites that requires, upon deployment, a connection to the database from the list of possible landing sites;
following the eliminating, provide a user, via a Graphical User Interface ("GUI"), a selection capability to select one of the list of possible landing sites as a default landing site for the deploying the mobile platform;
the processor further configured to query a list of entitlements for a client;
a display configured to display the list of entitlements for the client, said list of entitlements comprising a list of signatories with entitlement authorization;
a receiver configured to receive:
from the client, entitlement authorization for a single signatory;
a request to add the single signatory to the list; and
a modification to client information associated with the client;
a transmitter configured to transmit, only if the modification is input by the single signatory, the modification, independent of any human input, to a System of Record; and
the processor further configured to:
link the single signatory to one or more signature documents associated with the single signatory's authorization; and
transform, when received by the System of Record, the modified client information into updated client information reflecting the modification.

14. The apparatus of claim 13, wherein the single signatory is a first signatory, the receiver is further configured to:
receive, for the first signatory, a first entitlement level; and
receive, for a second signatory, a second entitlement level.

15. The apparatus of claim 13 wherein the signatories identified on the list of signatories are authorized to modify client documents.

16. The method of claim 13 wherein the signatories identified on the list of signatories are authorized to submit changes to client documents.

17. The apparatus of claim 13 wherein the modification is transmitted using Straight Through Processing.

18. The apparatus of claim 13 wherein the modification is transmitted without human intervention.

19. The apparatus of claim 13 wherein the transmitter is further configured to transmit client information in paragraph form.

20. The apparatus of claim 13 wherein the transmitter is configured to support an interactive pathway to available data relating to the interactive hierarchical entitlement map.

* * * * *